(12) United States Patent
Anglin et al.

(10) Patent No.: US 10,962,060 B2
(45) Date of Patent: Mar. 30, 2021

(54) OIL CONTROL FOR SEAL PLATES

(71) Applicant: Raytheon Technologies Corporation, Farmington, CT (US)

(72) Inventors: Christopher T. Anglin, Manchester, CT (US); Dwayne E. Messerschmidt, Dawsonville, GA (US); Christopher M. Valva, Manchester, CT (US); Todd M. Gaulin, Coventry, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/850,497

(22) Filed: Apr. 16, 2020

(65) Prior Publication Data
US 2020/0240471 A1 Jul. 30, 2020

Related U.S. Application Data

(62) Division of application No. 15/481,934, filed on Apr. 7, 2017, now Pat. No. 10,655,679.

(51) Int. Cl.
F16C 33/78 (2006.01)
F16J 15/44 (2006.01)
F01D 25/18 (2006.01)
F16C 19/06 (2006.01)
F16J 15/34 (2006.01)
F16C 27/04 (2006.01)

(52) U.S. Cl.
CPC ............ F16C 33/78 (2013.01); F01D 25/183 (2013.01); F01D 25/186 (2013.01); F16C 19/06 (2013.01); F16C 27/045 (2013.01); F16J 15/3404 (2013.01); F16J 15/443 (2013.01); F05D 2240/70 (2013.01); F16C 2360/23 (2013.01)

(58) Field of Classification Search
CPC ........ F16C 33/78; F16C 19/06; F16C 27/045; F16C 2360/23; F01D 25/18; F01D 25/186; F16J 15/3404; F16J 15/443; F05D 2240/70
See application file for complete search history.

(56) References Cited

U.S. PATENT DOCUMENTS

| 3,942,387 A | 3/1976 | Stone et al. |
| 4,396,197 A | 8/1983 | Shimizu |
| 4,406,459 A | 9/1983 | Davis et al. |

(Continued)

FOREIGN PATENT DOCUMENTS

| DE | 60306634 T2 | 6/2007 |
| FR | 2986568 A1 | 8/2013 |
| WO | WO2014/014791 A1 | 1/2014 |

OTHER PUBLICATIONS

Extended European Search Report for EP Application No. 18162563.3, dated Jan. 9, 2019, 10 pages.

Primary Examiner — Gilbert Y Lee
(74) Attorney, Agent, or Firm — Kinney & Lange, P.A.

(57) ABSTRACT

A seal assembly for a bearing compartment of a gas turbine engine includes a seal carrier, a seal element, a seal plate, and a trough. At least a portion of the seal element is within the seal carrier. The seal plate is in contact with the seal element and is configured to rotate relative to the seal element. The trough extends around the seal plate and comprises an annular channel positioned to capture oil slung from the seal plate.

7 Claims, 7 Drawing Sheets

(56) References Cited

U.S. PATENT DOCUMENTS

| | | | |
|---|---|---|---|
| 4,667,774 | A | 5/1987 | Roberge |
| 4,928,978 | A | 5/1990 | Shaffer et al. |
| 5,456,475 | A | 10/1995 | Abraham et al. |
| 6,467,578 | B1 | 10/2002 | Winfree |
| 6,547,255 | B1 | 4/2003 | Donaway et al. |
| 7,341,426 | B2 | 3/2008 | Schwarz et al. |
| 7,386,983 | B2 | 6/2008 | Miller |
| 7,500,365 | B2 | 3/2009 | Suciu et al. |
| 8,011,883 | B2 | 9/2011 | Schwarz et al. |
| 8,333,678 | B2 | 12/2012 | McCune |
| 8,585,538 | B2 | 11/2013 | Sheridan et al. |
| 8,919,134 | B2 | 12/2014 | Tatman et al. |
| 8,973,465 | B2 | 3/2015 | Duong |
| 9,068,515 | B2 | 6/2015 | Duong et al. |
| 9,074,681 | B2 | 7/2015 | Hanlom et al. |
| 9,115,650 | B2 | 8/2015 | McCune et al. |
| 2008/0003099 | A1 | 1/2008 | Giesler et al. |
| 2013/0234407 | A1* | 9/2013 | Parrish ..................... F02K 1/82 |
| | | | 277/650 |
| 2015/0152746 | A1 | 6/2015 | Maret et al. |
| 2016/0273657 | A1 | 9/2016 | Amador et al. |

\* cited by examiner

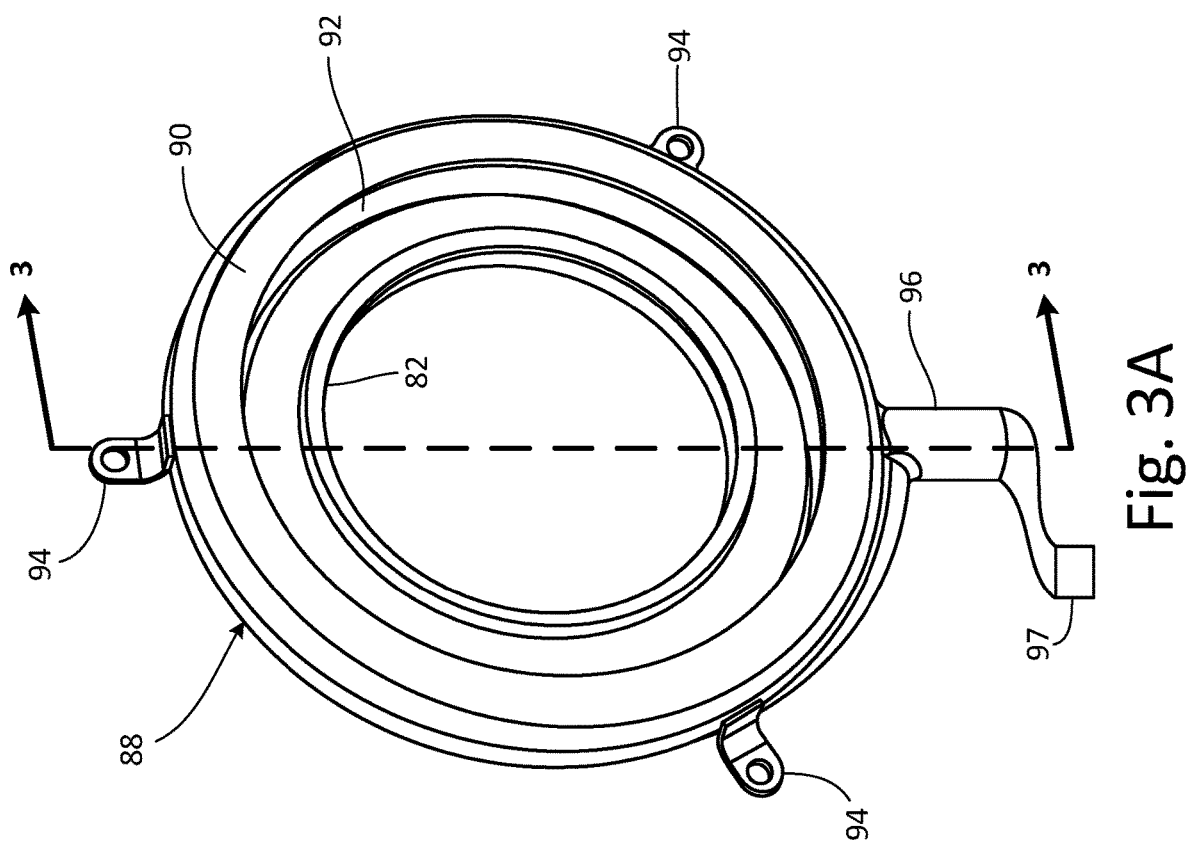

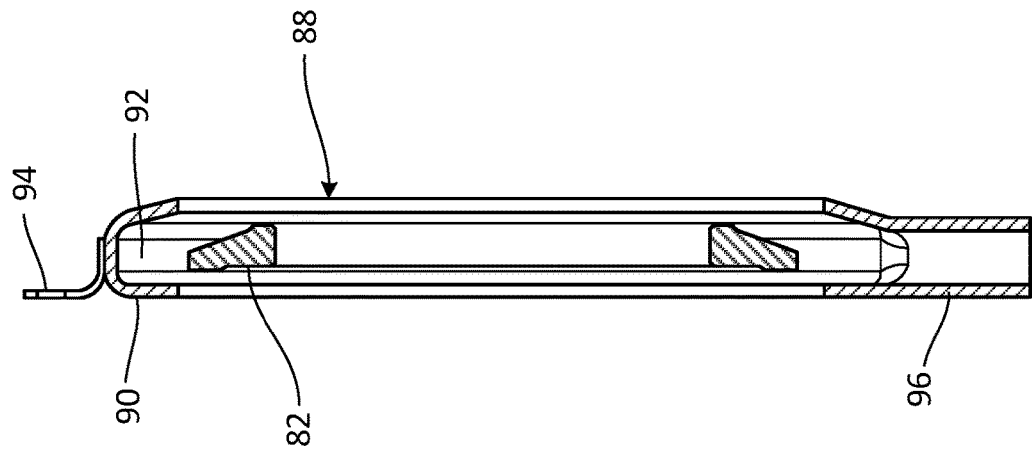
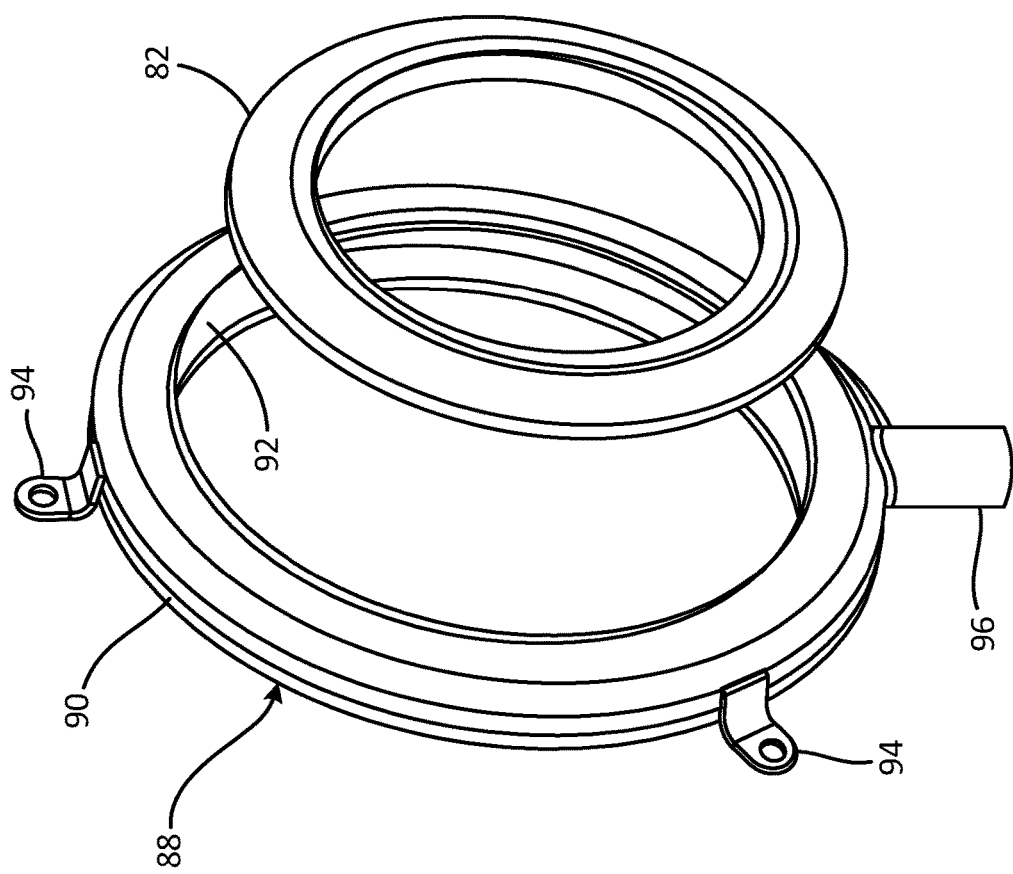
Fig. 3C
Fig. 3B

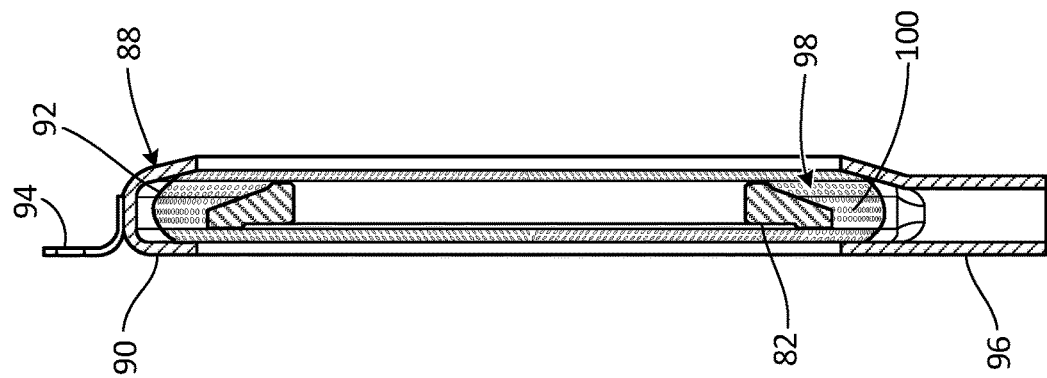
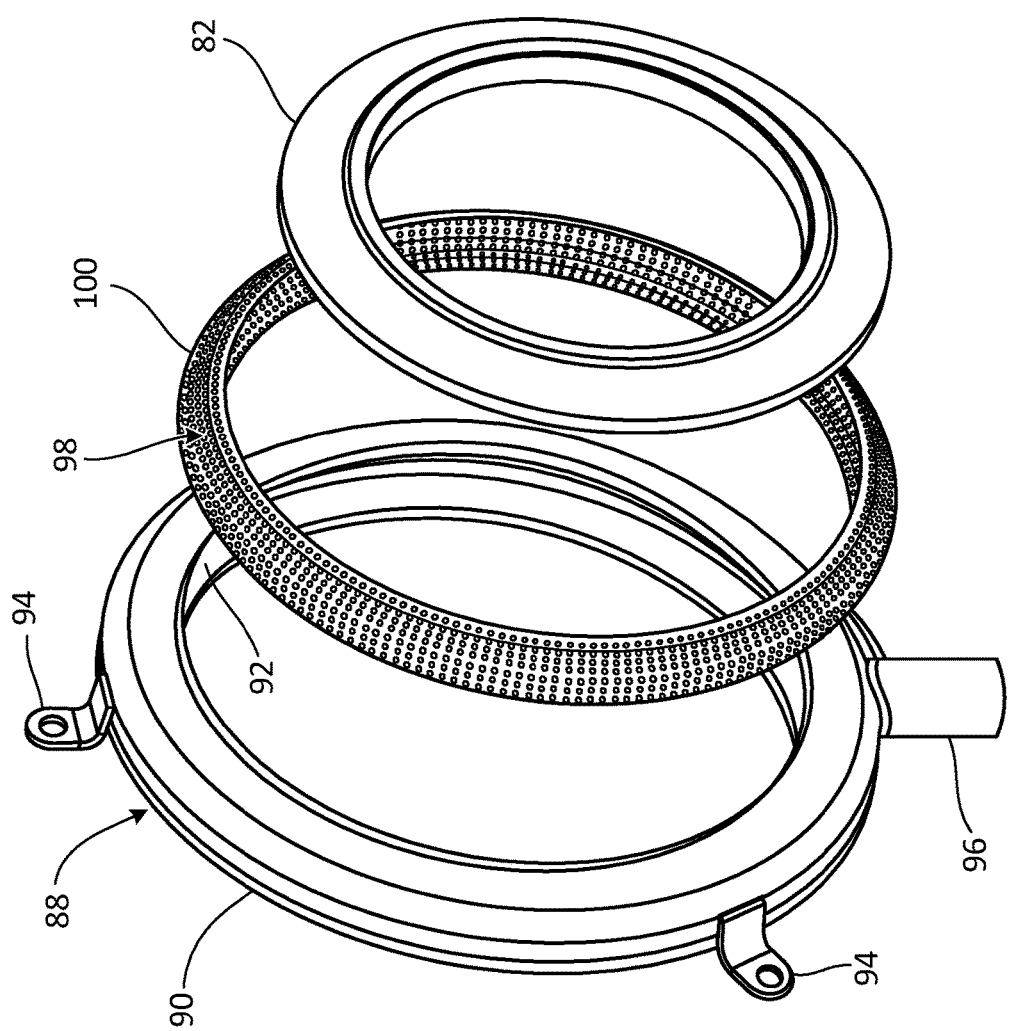
Fig. 4C
Fig. 4B

OIL CONTROL FOR SEAL PLATES

CROSS-REFERENCE TO RELATED APPLICATION(S)

This application is a divisional of U.S. application Ser. No. 15/481,934 filed Apr. 7, 2017, for "OIL CONTROL FOR SEAL PLATES" by C. Anglin, D. Messerschmidt, C. Valva, and T. Gaulin.

BACKGROUND

The present disclosure relates to a transmission system and more particularly, to controlling oil within a bearing compartment of a transmission system.

In a bearing compartment of a gas turbine engine, one method of sealing the bearing compartment involves a carbon face seal, consisting of a non-rotating carbon seal element, which interfaces with a rotating seal plate attached to a shaft in the gas turbine engine. Heat generation of the carbon seal is controlled by cooling oil that flows onto and through internal passages in the seal plate. The oil is then ejected by the rotating seal plate and circulates through the bearing compartment. Under certain conditions, or due to certain design geometries, oil from the seal plate can discharge directly onto adjacent gear components or circulate, via compartment windage, to nearby gear components. The oil can enter the gear mesh, causing additional heat generation, parasitic loses, and reduction in engine efficiency.

SUMMARY

A seal assembly for a bearing compartment of a gas turbine engine includes a seal carrier, a seal element, a seal plate, and a trough. At least a portion of the seal element is within the seal carrier. The seal plate is in contact with the seal element and is configured to rotate relative to the seal element. The trough extends around the seal plate and comprises an annular channel positioned to capture oil slung from the seal plate.

A method of controlling oil flow within a bearing compartment of a gas turbine engine includes rotating a seal plate relative to a seal element affixed to the bearing compartment. The seal plate is attached to a shaft of the gas turbine engine. Oil is slung from the rotating seal plate. The oil slung from the seal plate is captured in an annular channel of a trough surrounding the seal plate. The captured oil is directed to an exit that forms an outlet passage extending through a wall of the trough. The captured oil is drained through the exit.

A bearing compartment for a gas turbine engine includes a bearing assembly in the bearing compartment, a gear assembly in the bearing compartment, a seal assembly, and a trough. The seal assembly is within and is connected to a housing of the bearing compartment. The seal assembly includes a seal carrier, seal element, and a seal plate. At least a portion of the seal element is within the seal carrier. The seal plate is in contact with the seal element and is configured to rotate relative to the seal element. The seal plate includes a communication hole extending through the seal plate. The trough extends around the seal plate and includes a wall defining an annular channel. The trough is configured to capture oil slung off of the seal plate.

BRIEF DESCRIPTION OF THE DRAWINGS

FIG. 3A is a perspective view of a seal plate and a trough of the bearing compartment.

FIG. 3B is an exploded view of the seal plate and trough.

FIG. 3C is a cross-section view of the seal plate and the trough taken along section 3-3 in FIG. 3A.

FIG. 4B is an exploded view of the seal plate, a trough, and a screen of FIG. 4A.

FIG. 4C is a cross-section view of the seal plate, trough, and screen taken along section 4-4 in FIG. 4A.

DETAILED DESCRIPTION

Figure 1:
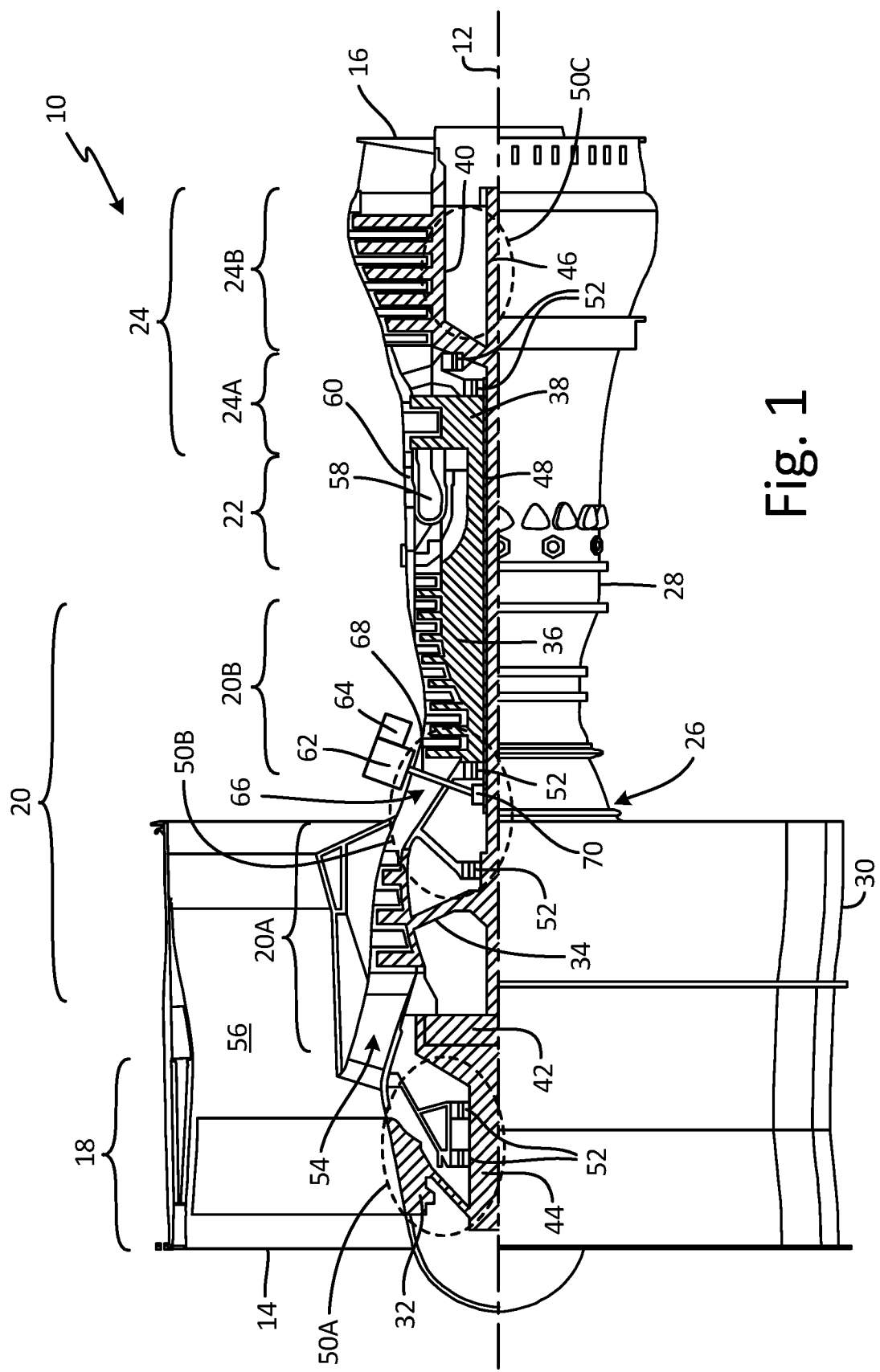
FIG. 1 is a side partial cross-section view of a turbine engine.

FIG. 1 shows a side elevation cutaway view of gas turbine engine 10 and includes axial centerline 12, upstream airflow inlet 14, downstream airflow exhaust 16, fan section 18, compressor section 20 (with low pressure compressor ("LPC") section 20A and high pressure compressor ("HPC") section 20B), combustor section 22, turbine section 24 (with high pressure turbine ("HPT") section 24A and low pressure turbine ("LPT") section 24B), engine housing 26 (with inner case 28 (e.g., a core case) and outer case 30 (e.g., a fan case)), fan rotor 32, LPC rotor 34, HPC rotor 36, HPT rotor 38, LPT rotor 40, gear train 42, fan shaft 44, low speed shaft 46, high speed shaft 48, bearing compartments 50A, 50B, and 50C, plurality of bearings 52, core gas path 54, bypass gas path 56, combustion chamber 58, combustor 60, accessory gearbox 62, gearbox attachments 64, transmission system 66, tower shaft 68, and geared assembly 70.

Gas turbine engine 10 extends along axial centerline 12 between upstream airflow inlet 14 and downstream airflow exhaust 16. Gas turbine engine 10 includes fan section 18, compressor section 20, combustor section 22, and turbine section 24. Compressor section 20 includes LPC section 20A and HPC section 20B. Turbine section 24 includes HPT section 24A and LPT section 24B.

Fan section 18, compressor section 20, combustor section 22, and turbine section 24 are arranged sequentially along centerline 12 within engine housing 26. Engine housing 26 includes inner case 28 (e.g., a core case) and outer case 30 (e.g., a fan case). Inner case 28 may house one or more of fan section 18, compressor 20, combustor section 22, and turbine section 24 (e.g., an engine core). Outer case 30 may house at least fan section 18. Each of gas turbine engine sections 18, 20A, 20B, 24A and 24B includes respective rotors 32-40. Each of these rotors 32-40 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

Fan rotor 32 is connected to gear train 42, for example, through fan shaft 44. Gear train 42 and LPC rotor 34 are connected to and driven by LPT rotor 40 through low speed shaft 46. The combination of at least LPC rotor 34, LPT rotor 40, and low speed shaft 46 may be referred to as "a low speed spool." HPC rotor 36 is connected to and driven by HPT rotor 38 through high speed shaft 48. The combination of at least HPC rotor 36, HPT rotor 38, and high speed shaft 48 may be referred to as "a high speed spool." Shafts 44-48 are rotatably supported by a plurality of bearings 52, which can be rolling element bearings, thrust bearings, or other types of bearings. Each of these bearings 52 is connected to engine housing 26 by at least one stationary structure such as, for example, an annular support strut.

During operation, air enters gas turbine engine 10 through airflow inlet 14. Air is directed through fan section 18 and is then split into either core gas path 54 or bypass gas path 56. Core gas path 54 flows sequentially through fan section 18, compressor section 20, combustor section 22, and turbine section 24. The air within core gas path 54 may be referred to as "core air." Bypass gas path 56 flows through a duct between inner case 28 and outer case 30. The air within bypass gas path 56 may be referred to as "bypass air."

The core air is compressed by LPC rotor 34 and HPC rotor 36 and directed into combustion chamber 58 of combustor 60 in combustor section 22. Fuel is injected into combustion chamber 58 and mixed with the core air that has been compressed by compressor section 20 to provide a fuel-air mixture. This fuel-air mixture is ignited and combustion products thereof expand and flow through and sequentially cause HPT rotor 38 and LPT rotor 40 to rotate. The rotations of HPT rotor 38 and LPT rotor 40 drive rotation of LPC rotor 34 and HPC rotor 36, respectively and compression of the air received from core gas path 54. The rotation of LPT rotor 40 also drives rotation of fan rotor 32, which propels bypass air through and out of bypass gas path 56. The propulsion of the bypass air may account for a majority of thrust generated by gas turbine engine 10, which can be more than 75% of engine thrust. Gas turbine engine 10 of the present disclosure, however, is not limited to the foregoing exemplary thrust ratio.

Gas turbine engine 10 of FIG. 1 also includes accessory gearbox 62, one or more gearbox attachments 64 and transmission system 66 in a mid-bearing compartment between LPC section 20A and HPC section 20B. Accessory gearbox 62 is mounted to inner case 28. However, in alternative embodiments, accessory gearbox 62 may be mounted elsewhere with gas turbine engine 10, such as to outer case 30. Accessory gearbox 62 is configured to transfer rotational energy (e.g., torque) between transmission system 66 and the one or more gearbox attachments 64. An example of an accessory gearbox is disclosed in U.S. Pat. No. 9,068,515 to Duong et al., which is assigned to the assignee of the present application. Examples of a gearbox attachment may include an air turbine starter, a de-oiler, a hydraulic pump, an oil pump, an integrated drive generator, a permanent magnet alternator and a fuel pump module. The present disclosure is not limited to including the foregoing exemplary types or configurations of accessory gearbox 62 or gearbox attachments 64.

Transmission system 66 is configured to mechanically couple and thereby transfer rotational energy (e.g., torque) between a rotating assembly (or component) of gas turbine engine 10 and accessory gearbox 62. In particular, transmission system 66 of FIG. 1 mechanically couples one of the low speed spool or high speed spool of gas turbine engine 10 to the accessory gearbox 62. Transmission system 66 includes high speed shaft 48, tower shaft 68, and geared assembly 70.

Figure 2:
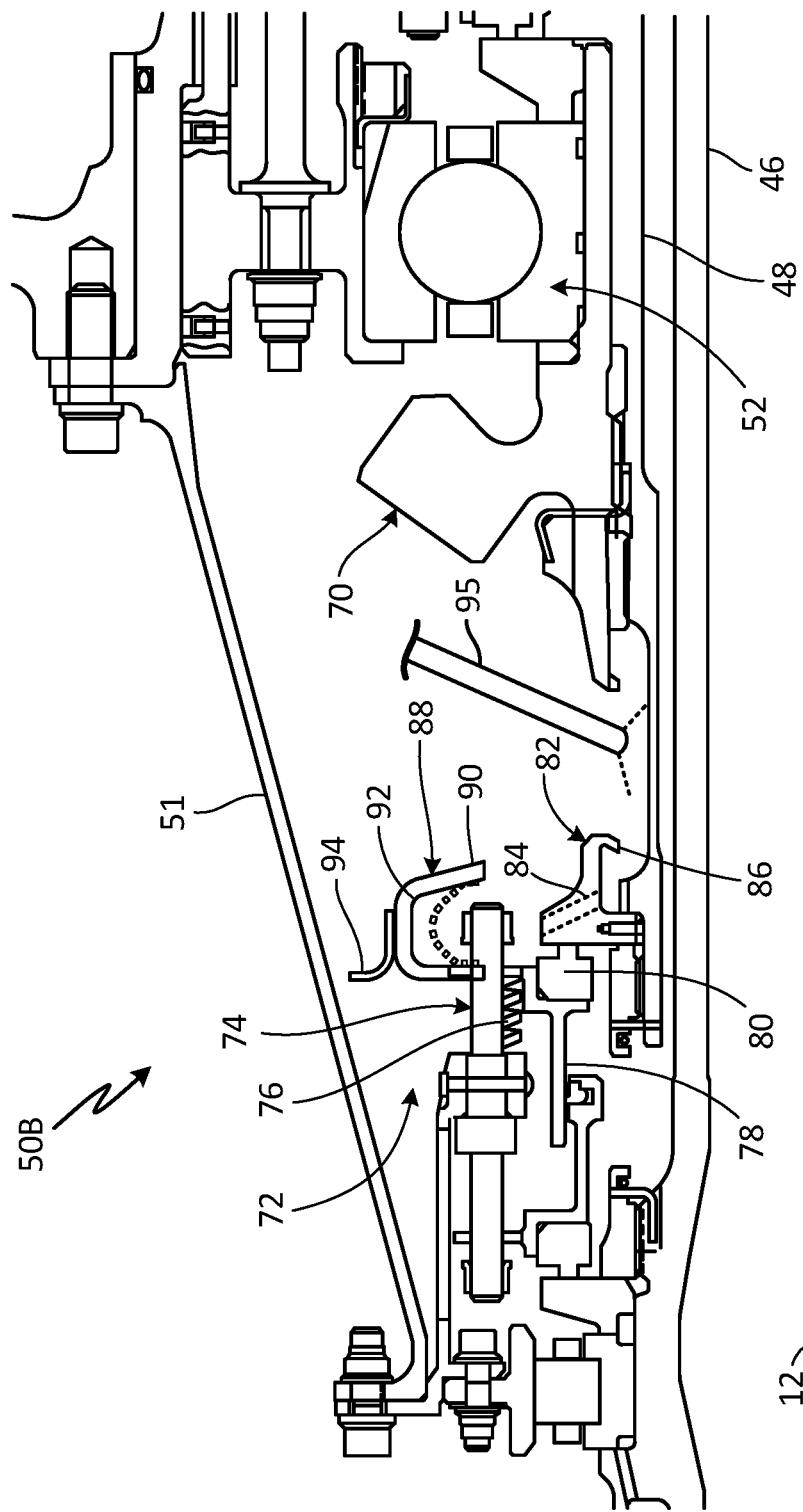
FIG. 2 is an enlarged cross-section view of a bearing compartment of the turbine engine.

FIG. 2 shows an enlarged cross-section view of bearing compartment 50B of turbine engine 10 and includes bearing compartment housing 51, bearings 52, geared assembly 70, and seal assembly 72 with torque pin 74, spring 76, seal carrier 78, seal element 80, seal plate 82 (including communication hole 84 and scoop 86), trough 88 (including wall 90, annular channel 92, and mounting features 94) and oil nozzle 95.

Bearing compartment housing 51 is a housing of bearing compartment 50B. Geared assembly 70 is an assembly of gears (e.g., bevel and/or bull gears), shafts (e.g., tower, low-speed, and/or high-speed shafts), and bearings. The configuration of geared assembly 70, its components and how they interact with one another is generally understood in the art. Seal assembly 72 is an assembly of seal components. In one non-limiting embodiment, seal assembly 72 includes an assembly of seal elements. Torque pin 74 is an elongate piece of solid material, generally in the shape of a cylinder. Spring 76 is a resilient element such as a helical spring.

Seal carrier 78 is an annular piece of solid material forming a track, channel or receiving space. Seal element 80 is a generally ring-shaped seal element such as a carbon seal. Seal plate 82 is a generally ring-shaped seal element. Communication hole 84 is a channel configured to transfer a fluid. Scoop 86 is a projection of solid material configured to collect a fluid. Trough 88 is an annular baffle. Wall 90 is a wall of trough 88 with a generally U-shaped cross section and an annular configuration. Annular channel 92 is a fluidic passageway with a generally annular geometry. In one non-limiting embodiment, annular channel 92 of trough 88 comprises a variable flow area around an outer edge or circumference of trough 88 such that a cross-sectional area of annular channel 92 varies (e.g., increases) along different circumferential positions along wall 90. Mounting features 94 are L-shaped tabs of solid material. Oil nozzle 95 is a nozzle configured to spray a fluid.

Bearing compartment housing 51 forms a housing around bearing compartment 50B. Geared assembly 70 is partially disposed within bearing compartment 50B. Seal assembly 72 is disposed within, connected to, and attached to bearing compartment housing 51. Torque pin 74 is connected to bearing compartment housing 51, through seal assembly 72, and to seal carrier 78. Spring 76 is attached to seal carrier 78 at a different circumferential position than where torque pin 74 is attached to seal carrier 78. Seal carrier 78 is attached to torque pin 74 such that seal carrier 78 is allowed to articulate with respect to: shaft slope, small shifts in axial centerline 12 due to maneuver load, and axial displacements of seal plate 82 due to thrust loads and thermal growth. Seal carrier 78 holds seal element 80. Seal element 80 is connected to seal carrier 78 such that seal carrier 78 receives seal element 80 within a receiving space of seal carrier 78.

Seal plate 82 is in contact with seal element 80. Seal plate 82 is configured to rotate relative to seal element 80. Communication hole 84 extends through a portion of seal element 82. Scoop 86 is connected to and extends axially from seal plate 82. Trough 88 extends around and is positioned radially outward from seal plate 82. Trough 88 is positioned such that annular channel 92 is positioned to capture a fluid (e.g., oil or lubricant) slung from seal plate 82. Trough 88 is disposed concentrically with seal plate 82. In one non-limiting embodiment, trough 88 forms an integral piece with at least one of seal assembly 72 or bearing compartment housing 51.

Wall 90 is an exterior of trough 88 and defines annular channel 92. Annular channel 92 is disposed within wall 90 of trough 88. Mounting features 94 extend from trough 88. In one non-limiting embodiment, mounting features 94 can have any shape or configuration (e.g., tabs), and/or can have one or multiple holes that are configured to accommodate bolts, rivets, or other fasteners or can have other attachment means, such as ridges, mounds, or a surface that is able to be welded, brazed, and/or adhered. Additionally, while FIGS. 3A-4C show trough 88 having three mounting features 94, trough 88 can have any number of mounting features 94 or can be configured to have no mounting features 94 and instead attach to a support structure (e.g., of bearing compartment 50B and/or bearing compartment housing 51, be integral to seal assembly 72) another way.

Mounting features 94 and wall 90 can be separate pieces connected to one another through various fastening means, including bolts, rivets, welds, brazing, adhesive, or another fastener. In another non-limiting embodiment, mounting features 94 and wall 90 can be formed together as one continuous and monolithic piece. Oil nozzle 95 is generally mounted relative to bearing compartment 50B and is fluidly connected to a source of oil.

Bearing compartment 50B is sealed with seal assembly 72 via seal element 80 held by seal carrier 78 and attached to bearing compartment 50B and is supported through springs 76 and torque pins 74. Seal element 80 interfaces with rotating seal plate 82 which is attached to a shaft (e.g., low or high speed shafts 46 or 48) in gas turbine engine 10. Seal element 80 and seal plate 82 forms a sealing interface for the prevention of fluidic (e.g., liquid and/or air) transmission across the interface between seal element 80 and seal plate 82.

Communication hole 84 provides fluid, such as oil (e.g., originating from oil nozzle 95), to seal plate 82 in order to cool and reduce friction between seal plate 82 and seal element 80. Heat generation of seal element 80 is controlled by cooling oil through communication hole(s) 84 in seal plate 82. The oil is applied to seal plate 82 with oil nozzle 95 (shown in FIG. 2) and collected from bearing compartment 50B by scoop 86. The oil is ejected into bearing compartment 50B by rotating seal plate 82, tangentially along with the direction of rotation of seal plate 82. The oil circulates through bearing compartment 50B where the oil generally ends up in a sump at a bottom of bearing compartment 50B, from where the oil is then evacuated.

As the oil is being slung off of seal plate 82, trough 88 is aligned in such a way that annular channel 92 of trough 88 captures the oil slinging off seal plate 82.

In existing designs without trough 88, under certain conditions and/or due to certain design geometries, oil slung from seal plate 82 can discharge directly onto adjacent gear components or circulate, via compartment windage, to nearby gear components (e.g., geared assembly 70). This slung oil churns or otherwise moves around bearing compartment 50B in which geared assembly 70 is located. The oil can enter a gear mesh of geared assembly 70, causing additional heat generation and parasitic loses, reducing engine efficiency. Such additional oil, if allowed to impinge geared assembly 70, increases windage within bearing compartment 50B and decreases the efficiency of geared assembly 70, and thus gas turbine engine 10, due to the contact between oil and geared assembly 70.

Trough 88 substantially prevents oil from being released into bearing compartment 50B, which prevents oil from impinging onto geared assembly 70. Without trough 88, oil is slung off of seal plate 82 and into bearing compartment 50B. Capturing oil slung off of seal plate 82 with annular channel 92 of trough 88 reduces windage within bearing compartment 50B and, thereby, further increases geared assembly 70 efficiency.

FIG. 3A shows a perspective view of seal plate 82, trough 88 (with wall 90, annular channel 92, mounting features 94, and exit 96), and scavenge port 97. FIG. 3B shows an exploded view of seal plate 82 and trough 88. FIG. 3C shows a cross-section view of seal plate 82 and trough 88 taken along section 3-3 in FIG. 3A. FIGS. 3A-3C will be discussed together.

Exit 96 is a fluidic outlet. Exit 96 is connected to wall 90 and is fluidly connected to annular channel 92. Exit 96 forms an outlet passage that extends through wall 90 of trough 88. In one non-limiting embodiment, exit 96 can be fluidly connected to or directed towards scavenge port 97 located in bearing compartment 50B. Scavenge port 97 is a channel configured for the passage of a fluid and is disposed in bearing compartment housing 51 of bearing compartment 50B. For clarity, scavenge port 97 is not included in FIG. 2 because scavenge port 97 would be disposed along a gravitational bottom of bearing compartment housing 51 and FIG. 2 shows a top portion of bearing compartment housing relative to gravity (e.g., downwards in FIG. 2)

Oil is directed around annular channel 92 by windage from the seal plate 82 and is directed to exit 96. Oil is also assisted, at least partially, by gravity to pass out of trough 88 through exit 96. Exit 96 is located in a quiet, benign area of bearing compartment 50B where oil entrainment into other elements within bearing compartment 50B can be minimized. In one non-limiting embodiment, exit 96 can be configured to direct oil to the location of scavenge port 97 in bearing compartment 50B.

The advantage here is that without trough 88 to capture the oil as it is slung off of seal plate 82, oil becomes entrained within bearing compartment 50B and impacts nearby components or bearing compartment hosing 51 with a high rate of velocity. The oil may also become entrained into other rotating components (e.g., geared assembly 70) before the oil can make it to a compartment sump or scavenge port 97 and be scavenged out. Entrainment of the oil can generate excess heat and reduce scavenge system effectiveness. Trough 88 prevents oil from impinging on other components within bearing compartment 50B while still directing the oil with exit 96 into a location in bearing compartment 50B that is desirable from the perspective of compartment efficiency, such as scavenge port 97.

Figure 4A:
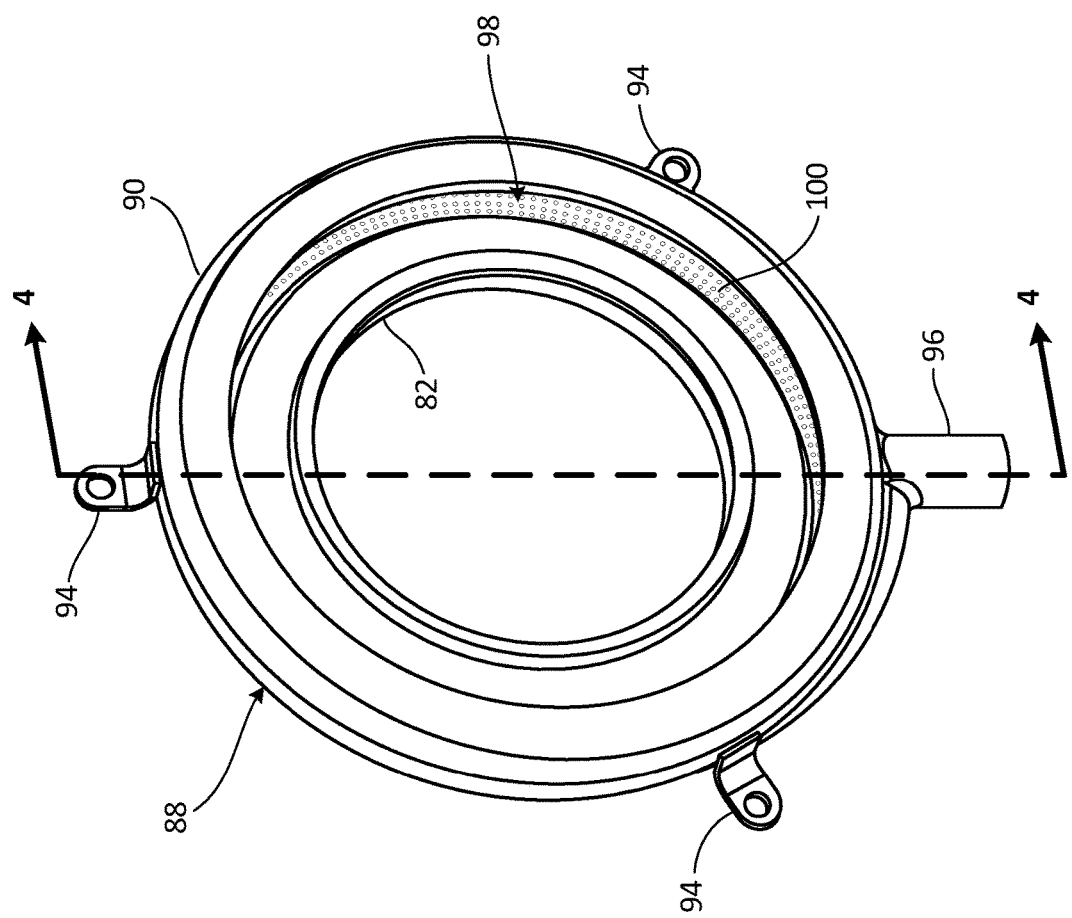
FIG. 4A is a perspective view of a seal plate, a trough, and a screen.

FIG. 4A shows a perspective view of seal plate 82, trough 88 (with wall 90, annular channel 92 (with momentary reference to FIGS. 4B-4C), mounting features 94, and exit 96), and screen 98 (with perforations 100). FIG. 4B shows an exploded view of seal plate 82, trough 88, and screen 98. FIG. 4C shows a cross-section view of seal plate 82, trough 88, and screen 98 taken along section 4-4 in FIG. 4A. FIGS. 4A-4C will be discussed together.

Screen 98 is a porous annular element. Perforations 100 are patterned openings. In one non-limiting embodiment, perforations 100 include a circular shape, however in other non-limiting embodiments, the shape of perforations 100 can include non-circular shapes. Screen 98 is disposed in annular channel 92 of trough 88. Screen 98 is disposed part way between seal plate 82 and wall 90.

Screen 98 is configured to separate the oil captured by trough 88 from windage produced by seal plate 82 as seal plate 82 rotates within bearing compartment 50B. As oil is slung off of seal plate 82, oil passes through perforations 100 in screen 98. Oil is then directed around annular channel 92 between screen 98 and wall 90 by windage from the seal plate 82. In other non-limiting embodiments, screen 98 can extend partially around a circumference of trough 88. In some other non-limiting embodiments, more than one screen 98 can disposed between trough 88 and seal plate 82 and include various sized perforations 100.

The shapes, patterns, areas of coverage, and configurations of perforations 100 of screen 98 can be designed to control the flow of oil through screen 98 to account for desired design and performance characteristics of seal assembly 72 (shown in FIG. 2).

Screen 98 allows the oil to be transported away from seal plate 82 and traps the oil between screen 98 and wall 90 of trough 88. By trapping the oil between screen 98 and wall 90, windage of the oil within trough 88 is decreased as well as impingement of the oil back onto seal plate 82 which increases the efficiency of geared assembly 70, (transmission system 54 and), thus, gas turbine engine 10.

Figure 5:
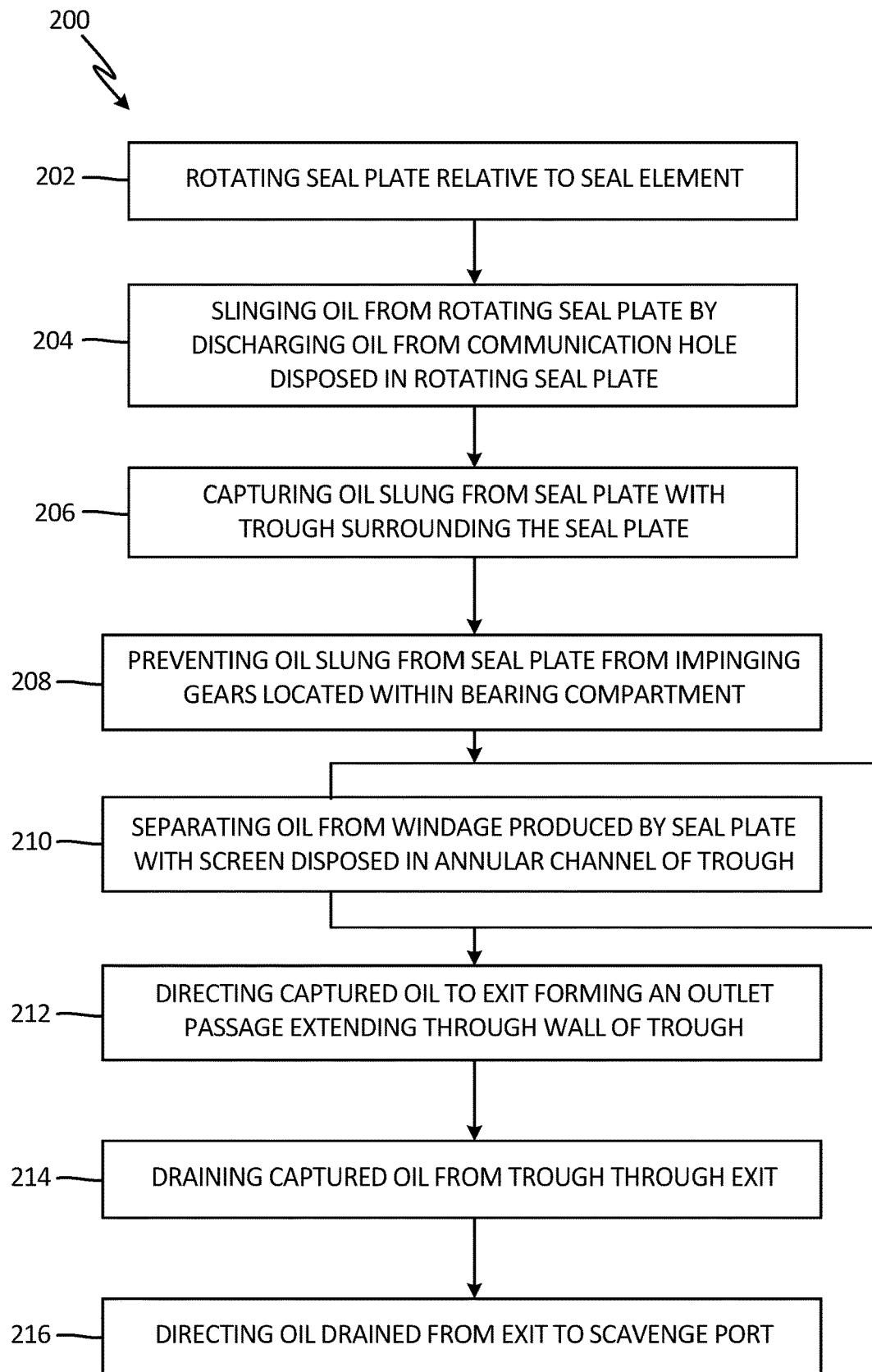
FIG. 5 is a flowchart of a method of controlling oil flow within the bearing compartment of the gas turbine engine.

FIG. 5 shoes a flowchart of method 200 of controlling oil flow within bearing compartment 50B of gas turbine engine 10, which includes steps 202-216.

Step 202 includes rotating seal plate 82, which is attached to a shaft of gas turbine engine 10, relative to seal element 80, which is affixed relative to bearing compartment 50B. Step 204 includes slinging oil from rotating seal plate 82 disposed within bearing compartment 50B. The oil is slung from rotating seal plate 82 by discharging the oil from communication hole 84 disposed in rotating seal plate 82. Step 206 includes capturing the oil slung from seal plate 82 with annular channel 92 of trough 88 surrounding seal plate 82. The oil is captured in annular channel 92 defined by wall 90 of trough 88. Step 208 includes preventing oil slung from seal plate 82 from impinging gears located in bearing compartment 50B. Step 210 includes separating the oil from windage produced by seal plate 82 with screen 98 disposed in annular channel 92 of trough 88. Step 212 includes directing the captured oil to exit 96 that forms an outlet passage extending through wall 90 of trough 88. Step 214 includes draining the captured oil from trough 88 through exit 96. Step 216 includes directing the oil drained from exit 96 to scavenge port 97 of bearing compartment 50B.

Discussion of Possible Embodiments

The following are non-exclusive descriptions of possible embodiments of the present invention.

A seal assembly for a bearing compartment of a gas turbine engine includes a seal carrier, a seal element, a seal plate, and a trough. At least a portion of the seal element is within the seal carrier. The seal plate is in contact with the seal element and is configured to rotate relative to the seal element. The trough extends around the seal plate and comprises an annular channel positioned to capture oil slung from the seal plate.

The seal assembly of the preceding paragraph can optionally include, additionally and/or alternatively, any one or more of the following features, configurations and/or additional components.

The trough can be disposed concentrically with the seal plate.

A mounting feature can be attached to and/or extend from the trough.

A screen can be disposed in the annular channel of the trough.

The screen can comprise perforations and can be configured to separate the oil captured by the trough from windage produced by the seal plate.

An exit can form an outlet passage that can extend through a wall of the trough.

A method of controlling oil flow within a bearing compartment of a gas turbine engine includes rotating a seal plate relative to a seal element affixed to the bearing compartment. The seal plate is attached to a shaft of the gas turbine engine. Oil is slung from the rotating seal plate. The oil slung from the seal plate is captured in an annular channel of a trough surrounding the seal plate. The captured oil is directed to an exit that forms an outlet passage extending through a wall of the trough. The captured oil is drained through the exit.

The method of the preceding paragraph can optionally include, additionally and/or alternatively, any one or more of the following steps, features, configurations and/or additional components.

The oil slung from the seal plate can be prevented from impinging gears located in the bearing compartment.

The oil can be separated from windage produced by the seal plate with a screen disposed in the annular channel of the trough.

Slinging oil from the rotating seal plate can comprise discharging the oil from a communication hole disposed in the rotating seal plate.

The oil drained from the exit can be directed to a scavenge port of the bearing compartment.

A bearing compartment for a gas turbine engine includes a bearing assembly in the bearing compartment, a gear assembly in the bearing compartment, a seal assembly, and a trough. The seal assembly is within and is connected to a housing of the bearing compartment. The seal assembly includes a seal carrier, seal element, and a seal plate. At least a portion of the seal element is within the seal carrier. The seal plate is in contact with the seal element and is configured to rotate relative to the seal element. The seal plate includes a communication hole, or holes, extending through the seal plate. The trough extends around the seal plate and includes a wall defining an annular channel. The trough is configured to capture oil slung off of the seal plate.

The seal assembly of the preceding paragraph can optionally include, additionally and/or alternatively, any one or more of the following features, configurations and/or additional components.

A series of mounting features can be attached to and extend from the trough.

A screen can be disposed in the annular channel of the trough.

The screen can comprise perforations and can be configured to separate the oil captured by the trough from windage produced by the seal plate.

The trough can form an integral piece with the seal carrier and/or the bearing compartment housing.

An exit can form an outlet passage that extends through the wall of the trough.

The annular channel of the trough can comprise a variable flow area around a circumference of the trough.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bearing compartment for a gas turbine engine, the bearing compartment comprising:
   a bearing assembly in the bearing compartment;
   a geared assembly in the bearing compartment;
   a seal assembly within and connected to a housing of the bearing compartment, the seal assembly comprising:

a seal carrier;

a seal element, wherein at least a portion of the seal element is within the seal carrier;

a seal plate in contact with the seal element, wherein the seal plate includes a communication hole extending through the seal plate, and wherein the seal plate is configured to rotate relative to the seal element; and a trough extending around the seal plate, wherein the trough comprises a wall defining an annular channel, and the trough is configured to capture oil slung off of the seal plate.

2. The bearing compartment of claim 1, wherein a series of mounting features are attached to and extend from the trough.

3. The bearing compartment of claim 1 further comprising a screen disposed in the annular channel of the trough.

4. The bearing compartment of claim 3, wherein the screen comprises perforations and is configured to separate the oil captured by the trough from windage produced by the seal plate.

5. The bearing compartment of claim 1, wherein the trough forms an integral piece with the seal carrier or the bearing compartment housing.

6. The bearing compartment of claim 1 further comprising an exit forming an outlet passage that extends through the wall of the trough.

7. The bearing compartment of claim 1, wherein the annular channel of the trough comprises a variable flow area around a circumference of the trough.

\* \* \* \* \*